United States Patent Office 3,553,100
Patented Jan. 5, 1971

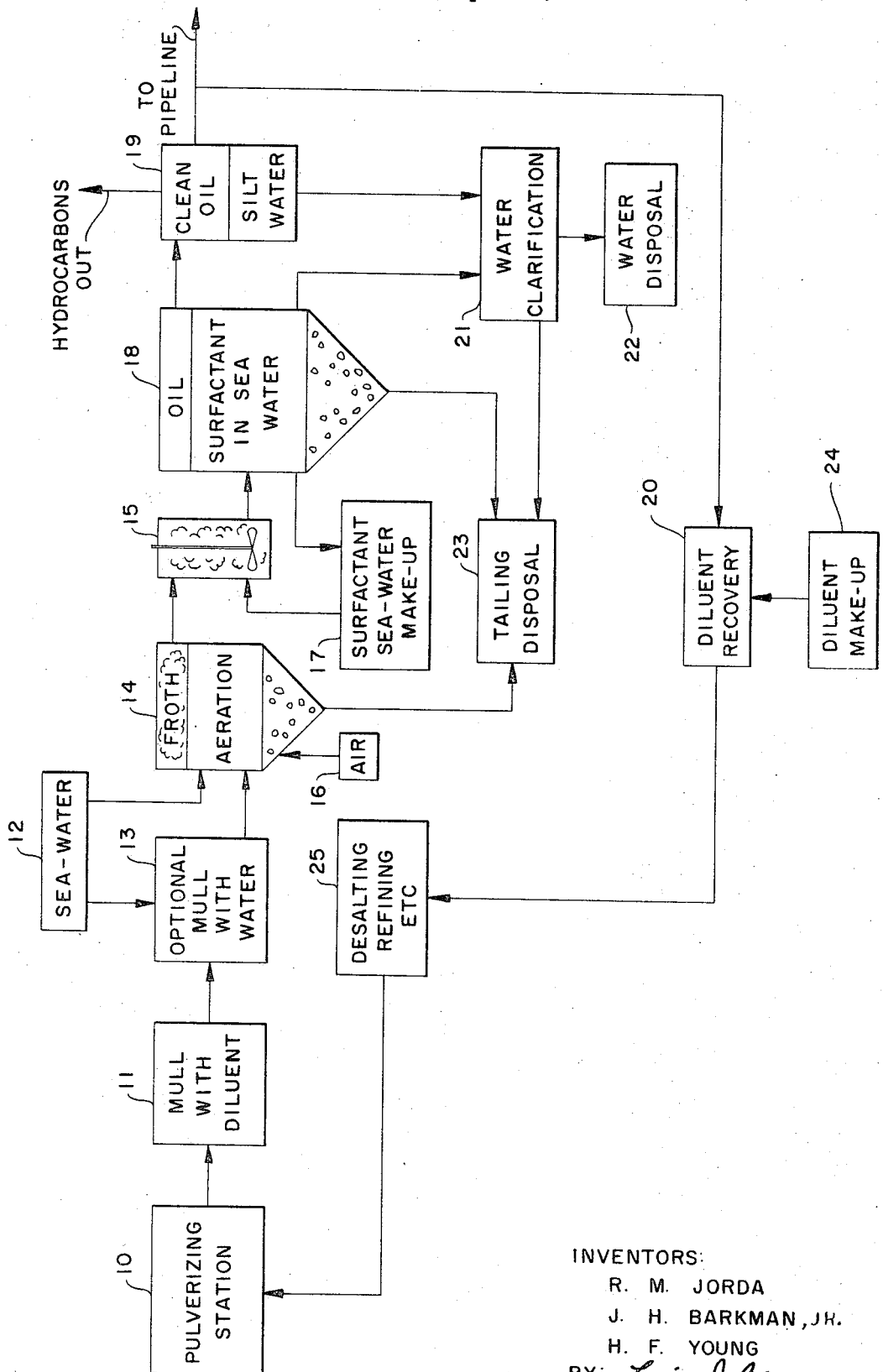

3,553,100
UPGRADING OF OIL RECOVERED FROM BITUMINOUS SANDS
Robert M. Jorda, Houston, Tex., James H. Barkman, Jr., Ventura, Calif., and Homer F. Young, Houston, Tex.; said Jorda and said Barkman, Jr., assignors to Shell Oil Company, New York, N.Y., a corporation of Delaware
Filed Sept. 18, 1968, Ser. No. 760,493
Int. Cl. C10g 1/04
U.S. Cl. 208—11      13 Claims

ABSTRACT OF THE DISCLOSURE

A process for breaking or separating an emulsified mixture of liquid hydrocarbon, insoluble fluid and finely divided solid material. The emulsified mixture is mixed with a volume of hot brine having controlled pH and containing a surfactant material in which ethylene oxide groups acyl radicals, and from about 10 to 22 carbon atoms are contained in each of the molecules of a surfactant that exhibits a significant amount of solubility in both oil and brine. Hydrocarbon materials that are substantially free of solids and aqueous liquids and float in the brine are isolated and the hydrocarbon components of the isolated materials are recovered.

BACKGROUND OF THE INVENTION

Field of the invention.—This invention relates to a process for separating or breaking an emulsified mixture of liquid hydrocarbon, insoluble fluid and finely divided solid material; and, more particularly, to a process for breaking down an emulsion or froth containing hydrocarbons, water, gas and finely divided solids.

Description of the prior art.—Large deposits of bituminous sand are found in various localities throughout the world. The term "bituminous sand" is used herein to include those materials commonly referred to as oil sands, tar sands, and the like. One of the most extensive deposits of bituminous sands occurs for instance, in the Athabasca district of the Province of Alberta, Canada, and extends for many thousands of square miles in thicknesses ranging up to more than 200 feet.

Various methods have been proposed previously for separating crude oil from bituminous sands such as the Alberta tar sands, but none of these methods has met with any substantial success. Since the crude oil obtainable from this type of bituminous sand is a relatively viscous material having high tar content and relatively low commercial value in comparison with other crude oils, a successful commercial process must involve relatively little expense in the separation of the crude oil from the bituminous sands. Operating costs of previously conceived methods for separating the oil from bituminous sands have been sufficiently high so as to discourage commercial exploitation.

Several methods for separating such emulsified mixtures, such as recovering hydrocarbons from tar sands, have been proposed. Among such methods are water flotation, gravity separation, cold water flotation, centrifugal separation, solvent extraction or various combinations thereof. The hydrocarbon product recovered by these schemes (tar, bitumen and sometimes solvent) commonly contains, after the initial separation from the bulk of the sand, significant amounts of water, mineral matter and sometimes air or gas as an emulsion or froth. Treatment of this emulsion or froth, which is often stabilized by finely divided minerals such as clays as well as by naturally occurring surfactants in the tar, to eliminate contaminants and produce marketable hydrocarbons has proven difficult and is often a major technological and economic obstacle.

A process for the recovery of oil from a tar sand using readily available sea water containing a surfactant is disclosed in a copending application to Barkman et al., Ser. No. 760,432, filed Sept. 18, 1968. However, it is necessary in such processes that suitable surfactants be provided which are compatible with both oil and brine in the breaking and separation of emulsions that contain oil, fine solids and oil-immiscible fluids.

SUMMARY OF THE INVENTION

It is an object of our invention to provide an improved process for breaking or separating an emulsified mixture comprising a liquid hydrocarbon, an insoluble fluid and a finely divided solid material.

It is a further object of our invention to provide a method of separating oil from bituminous sands by aqueous extraction using neutral or acidic brine or sea water containing a surfactant having good oil and water solubility.

It is an even further object of our invention to provide such an aqueous extraction process which avoids the necessity for using alkaline materials, pH control or centrifugation.

It is a still further object of our invention to provide a tar sand extraction process which results in the production of a final hydrocarbon product which is free of significant amounts of water or solids.

These objects are preferably carried out by mixing the emulsified mixture with a volume of hot brine having a controlled pH and containing a surfactant material in which ethylene oxide groups, acyl radicals, and from about 10 to 22 carbon atoms are contained in each of the molecules of a surfactant that exhibits a significant amount of solubility in both oil and brine. Hydrocarbon materials that are substantially free of solids and aqueous liquids and float in the brine are isolated and the hydrocarbon components of the isolated materials are recovered.

In a preferred application of our invention, the emulsified mixture is a tar froth or emulsion, the insoluble fluid is a water or gas, and the finely divided solid materials are clays.

BRIEF DESCRIPTION OF THE DRAWING

The drawing is a diagrammatic illustration of a suitable arrangement for carrying out a preferred embodiment of the invention.

DESCRIPTION OF THE PREFERRED EMBODIMENT

When oil-bearing tar sand is mixed with a suitable solvent, the oil can then be displaced with water under certain conditions. The aforementioned copending application to Barkman et al. discusses in detail the prior art of this phenomenon. Although the process of this invention will be described hereinbelow with respect to the recovery of tar from a tar sand (i.e., oil from a tar froth), the principles disclosed herein are applicable to the separating or breaking down into its various components of any emulsified mixture of liquid hydrocarbon, insoluble fluid (e.g., a gas or an aqueous liquid), and finely divided solid material.

In the process of our invention, referring now to the drawing, tar sand ore is pulverized as by crushing or grinding in any conventional manner at a pulverizing station 10. The method of crushing or grinding the tar sand is not critical and a suitable process is disclosed in a U.S. Pat. No. 2,924,565 to Steagemeier et al.

The pulverized ore is next mulled at mulling station 11 with a suitable hydrocarbon diluent as will be discussed further hereinbelow in a conventional manner for a period long enough to allow the tar and diluent to mutually dissolve. The tar sand is substantially uniformly diluted to an oil phase exhibiting a viscosity of less than about 100 cp. at a temperature of less than about 200° F.

At this point, if desired, the ore-diluent mixture may be mulled at station 13 with hot liquid brine or sea water, received from a sea water source 12, having a pH of not more than about 7 and a volume sufficient to extend between materials which float and sink in the brine or sea water so as to change the slurry characteristics of the ore. This step is optional and not necessary for carrying out the process of our invention. The resulting ore-diluent mixture (or slurry) at station 13 is introduced into a flotation stage or process comprising one or more flotation cells (such as skimming stage 14, countercurrent washer 15, and aeration cell 16) which may employ in cell 16 aeration from any convenient air source or other conventional techniques as indicated to create a froth or emulsion upon the introduction of brine or sea water into the cell.

A discussion of the advantages and important features of the overall process described hereinabove appears in copending application to Barkman et al., Ser. No. 760,432 and is incorporated herein by reference. Additionally, the froth introduced into the flotation cell (i.e., the countercurrent washer 15) is preferably agitated or mixed with a surfactant wash (i.e., sea water or brine and a suitable surfactant) comprising an aqueous solution of an anionic surface-active material which is a free acid or salt of a complex organic phosphate ester (as for example, Gafac RE-610, manufactured by the Antara Chemical Division of the General Analine and Film Company and described in a General Analine Article appearing on page 40 of vol. 39, No. 52, of the Chemical and Engineering News, Dec. 25, 1961, and also described in U.S. Pat. Nos. 3,331,896 and 3,168,478. The froth immediately collapses and solid mineral matter and water falls out of the hydrocarbon layer (station 18) leaving a clean oil at station 19 suitable for diluent recovery [station 20, pipelining, (as indicated in the drawing) or refining (station 25)]. The "water" used in wash may be readily available sea water as discussed hereinabove as this particular surfactant (i.e., the Gafac RE-610) has a high electrolyte tolerance. Further, the Gafac RE-610 surfactant permits our process to be used in an acidic sea water. The temperature may range from ambient to 212° F. or higher, although the reaction proceeds faster at the higher temperatures. The amount of the surfactant required varies with the individual tar sand and, more particularly, with the amount of clay and finely dispersed minerals present. The volume of the surfactant wash is not critical within a broad range but may be, for example, about the same volume of the froth itself, or the surfactant could be added directly to the froth in a concentrated form. The amount of settling time required to produce a clean oil layer at station 19 is short, say, of the order of an hour or less.

As discussed hereinabove and in the copending application to Barkman et al. Ser. No. 760,432, the surfactant wash must be added after the froth is produced rather than at some earlier stages such as at the mulling stations 11 and 13 or the flotation stations 14, 15 and 16. Although the addition of this surfactant in the early stages may or may not produce other benefits such as improved tar recovery, it is not desirable from the standpoint of removing solids, air and water from the froth and may even make such removal more difficult.

Although a specific surfactant is disclosed hereinabove, the process of our invention may be carried out with any surfactant exhibiting a significant amount of solubility in both oil and brine as disclosed in the copending application to Barkman et al. Ser. No. 760,432. However, best results are obtained by using a surfactant such as Gafac RE-610 discussed above or any suitable closely related compound, as for example, any surfactant material in which ethylene oxide groups, acyl radicals and from about 10 to 22 carbon atoms are contained in each of the molecules of a surfactant that exhibits a significant amount of solubility in both oil and brine in addition to having a pH of not more than about 7 and a volume sufficient to extend between materials which float and sink in the brine.

We claim as our invention:

1. In a process for separating an emulsified mixture of liquid hydrocarbon, insoluble fluid and finely divided solid material, the process comprising the steps of:
   mixing said emulsified mixture with a volume of hot brine which:
   (a) contains a surfactant material having good oil-water solubility in which ethylene oxide groups, acyl radicals, and from about 10 to 22 carbon atoms are contained in each of the molecules of a surfactant that exhibits a significant amount of solubility in both oil and brine;
   (b) has a pH of not more than about 7; and
   (c) is a volume sufficient to extend between materials which float and sink in the brine; and
   isolating hydrocarbon materials that are substantially free of solids and aqueous liquids and float in the brine.

2. The process of claim 1 including the step of recovering the hydrocarbon components of the isolated materials.

3. The process of claim 1 wherein the process of mixing said emulsified mixture with a volume of brine includes mixing said mixture with hot liquid sea water.

4. A process for recovering oil from a tar sand comprising the steps of:
   pulverizing said tar sand;
   mixing said pulverized tar sand with liquid hydrocarbon diluent;
   mixing the hydrocarbon-diluted tar sand with a first volume of hot brine having a controlled pH;
   isolating the materials which float in the first volume of hot brine and mixing them with a second volume of hot brine which contains a surfactant material in which ethylene oxide groups, acyl radicals and from about 10 to 22 carbon atoms are contained in each of the molecules of a surfactant that exhibits a significant amount of solubility in both brine and oil, said second volume of hot brine having a controlled pH; and
   isolating any hydrocarbon materials that are substantially free of solids and aqueous liquids and float in the second volume of brine.

5. The process of claim 4 including the steps of:
   evaporating for reuse any hydrocarbons that are substantially as volatile as the liquid hydrocarbon diluent; and
   recovering the remaining oil.

6. The process of claim 5 including the step of clarifying any water recovered during the steps of isolating any hydrocarbon materials which float in the second volume of brine and evaporating any hydrocarbons substantially as volatile as the diluent; and
   disposing of any tailings recovered during the steps of clarifying any water recovered and isolating any hydrocarbon materials floating in the first and second volumes of brine.

7. The process of claim 4 wherein the steps of mixing the diluted tar sand with first and second volumes of brine includes mixing said diluted tar sand with first and second volumes of hot liquid sea water.

8. The process of claim 4 including the step of mulling said hydrocarbon-diluted tar sand with brine having a pH of not more than about 7 and a volume sufficient to extend between materials which float and sink in the brine in an amount sufficient to change the slurry characteristics of said tar sand prior to mixing with a first volume of brine.

9. The process of claim 4 wherein the step of isolating the materials which float in the first volume of brine includes the step of aerating the mixture of the hydrocarbon-diluted tar sand and brine.

10. The process of claim 4 wherein the step of mixing the materials which float in the first volume of brine includes the step of countercurrent washing said material which float in the first volume of brine while mixing with the second volume of brine containing a surfactant.

11. The process of claim 4 including the step of recovering brine containing said surfactant during the step of isolating any hydrocarbon materials that float in the second volume of brine; and
using said recovered brine containing said surfactant as the brine containing a surfactant required in the step of mixing materials which float in a first volume of brine with a second volume of brine containing a surfactant.

12. The process of claim 4 wherein all of the foregoing steps are carried out at temperatures in the range of ambient to 212° F.

13. In a process for recovering oil from a tar sand comprising the steps of:
pulverizing said tar sand;
mixing said pulverized tar sand with liquid hydrocarbon diluent in an amount sufficient to substantially uniformly dilute all of said tar sand to an oil phase exhibiting a viscosity of less than about 100 cp. at a temperature of less than about 200° F.;
mixing the hydrocarbon-diluted tar sand with a first volume of brine having a pH of not more than about 7 and a volume sufficient to extend between any materials which float and sink in the brine;
isolating the materials which float in the first volume of brine and mixing them with a second volume of brine which contains a surfactant material in which ethylene oxide groups, acyl radicals and from about 10 to 22 carbon atoms are contained in each of the molecules of a surfactant that exhibits a significant amount of solubility in both brine and oil, said second volume of brine having a pH of not more than about 7 and a volume sufficient to extend between any materials which float and sink in the brine; and
isolating any hydrocarbon materials that are substantially free of solids and aqueous liquids and float in the second volume of brine.

References Cited
UNITED STATES PATENTS

| | | | |
|---|---|---|---|
| 1,615,121 | 1/1927 | Fyleman et al. | 208—11 |
| 2,790,750 | 4/1957 | Eyre | 208—11 |
| 2,825,677 | 3/1958 | Coulson | 208—11 |
| 2,910,424 | 10/1959 | Tek et al. | 208—11 |
| 2,924,566 | 2/1960 | Vaell et al. | 208—11 |
| 3,468,789 | 9/1969 | Balassa | 208—188 |

CURTIS R. DAVIS, Primary Examiner

U.S. Cl. X.R.

208—188